(12) United States Patent
Moon et al.

(10) Patent No.: US 9,525,824 B2
(45) Date of Patent: Dec. 20, 2016

(54) METHOD AND APPARATUS FOR PROCESSING IMAGE ACCORDING TO IMAGE CONDITIONS

(71) Applicant: Samsung Electronics Co., Ltd., Suwon-si, Gyeonggi-do (KR)

(72) Inventors: Young-su Moon, Seoul (KR); Si-hwa Lee, Seoul (KR); Do-hyung Kim, Hwaseong-si (KR); Hyun-sang Park, Cheonan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/269,559

(22) Filed: May 5, 2014

(65) Prior Publication Data
US 2014/0333801 A1 Nov. 13, 2014

(30) Foreign Application Priority Data

May 7, 2013 (KR) .................. 10-2013-0051270

(51) Int. Cl.
*H04N 5/235* (2006.01)
*H04N 5/232* (2006.01)
*H04N 1/21* (2006.01)

(52) U.S. Cl.
CPC .......... *H04N 5/2355* (2013.01); *H04N 1/2145* (2013.01); *H04N 5/232* (2013.01); *H04N 5/235* (2013.01); *H04N 5/23229* (2013.01); *H04N 5/23267* (2013.01); *H04N 5/23277* (2013.01); *G06T 2207/20208* (2013.01)

(58) Field of Classification Search
CPC combination set(s) only.
See application file for complete search history.

(56) References Cited

U.S. PATENT DOCUMENTS

| | | | |
|---|---|---|---|
| 7,345,688 B2 | 3/2008 | Baudisch et al. | |
| 8,036,486 B2* | 10/2011 | Sakurai | G06T 5/009 382/255 |
| 8,081,220 B2* | 12/2011 | Kawai | H04N 5/23248 348/208.1 |
| 8,237,813 B2* | 8/2012 | Garten | G09G 5/06 348/229.1 |
| 8,326,662 B1 | 12/2012 | Byrne et al. | |
| 2003/0117518 A1* | 6/2003 | Pyle | H04N 5/2351 348/364 |
| 2007/0229699 A1* | 10/2007 | Hamamura et al. | 348/362 |
| 2009/0040364 A1* | 2/2009 | Rubner | G06T 3/4053 348/362 |

(Continued)

OTHER PUBLICATIONS

Office Action mailed Sep. 26, 2014 in related U.S. Appl. No. 14/292,239.

*Primary Examiner* — Twyler Haskins
*Assistant Examiner* — Akshay Trehan
(74) *Attorney, Agent, or Firm* — Staas & Halsey LLP

(57) ABSTRACT

An image processing apparatus and a method are provided. The image processing apparatus includes an accumulator for accumulating image data in which images are accumulated when the images are input from an image sensor, a memory for storing the pieces of image data that are output from the accumulator, and a processor for generating a final image using at least one image data from among the pieces of image data that are stored in the memory.

13 Claims, 6 Drawing Sheets

(56) References Cited

U.S. PATENT DOCUMENTS

| | | | |
|---|---|---|---|
| 2009/0046947 A1* | 2/2009 | Kobayashi | G06T 5/50 |
| | | | 382/284 |
| 2009/0304300 A1 | 12/2009 | Minobe | |
| 2010/0022275 A1 | 1/2010 | Shu | |
| 2010/0031169 A1 | 2/2010 | Jang et al. | |
| 2010/0075234 A1 | 3/2010 | Cousins | |
| 2010/0083144 A1 | 4/2010 | Baxley et al. | |
| 2010/0232726 A1* | 9/2010 | Liu | H04N 1/4072 |
| | | | 382/274 |
| 2010/0265357 A1* | 10/2010 | Liu | G06T 5/50 |
| | | | 348/223.1 |
| 2011/0157621 A1 | 6/2011 | Fu et al. | |
| 2011/0205381 A1* | 8/2011 | Vranceanu | G06T 5/009 |
| | | | 348/217.1 |
| 2011/0221766 A1 | 9/2011 | Ko et al. | |
| 2012/0002098 A1* | 1/2012 | Ueda | H04N 5/235 |
| | | | 348/362 |
| 2012/0002899 A1* | 1/2012 | Orr et al. | 382/282 |
| 2012/0262600 A1* | 10/2012 | Velarde et al. | 348/223.1 |
| 2013/0176458 A1* | 7/2013 | Van Dalen | H04N 5/232 |
| | | | 348/231.99 |
| 2013/0202204 A1* | 8/2013 | Yamanaka | G06T 5/003 |
| | | | 382/167 |
| 2013/0258175 A1* | 10/2013 | Osawa | H04N 5/2351 |
| | | | 348/364 |

* cited by examiner

METHOD AND APPARATUS FOR PROCESSING IMAGE ACCORDING TO IMAGE CONDITIONS

CROSS-REFERENCE TO RELATED APPLICATIONS

This application is related to, and claims the priority benefit of, Korean Patent Application No. 10-2013-0051270, filed on May 7, 2013, in the Korean Intellectual Property Office, the disclosure of which is incorporated herein in its entirety by reference.

BACKGROUND

1. Field

Exemplary embodiments relate to methods and apparatuses for adaptive image processing according to image conditions.

2. Description of the Related Art

An image converted by an image sensor includes rolling shutter distortion, low illumination noise, motion blur, backlight, or the like. Improvement of the quality of the image and addressing the above-described problems are desired.

In order to generate a high dynamic range (HDR) image, a method has been used of generating a high-contrast and high-resolution image by capturing images having different exposure times and generating the HDR image, using the images having different exposure times.

SUMMARY

Exemplary methods and apparatuses for adaptive image processing according to image conditions are provided.

Additional aspects will be set forth in part in the description which follows and, in part, will be apparent from the description, or may be learned by practice of the presented embodiments.

According to an aspect of an exemplary embodiment, an image processing apparatus includes an accumulator for accumulating image data in which images are accumulated when the images are input from an image sensor, a memory for storing the pieces of image data that are output from the accumulator, and a processor for generating a final image using at least one image data from among the pieces of image data that are stored in the memory.

According to an aspect of an exemplary embodiment, an image processing method includes accumulating pieces of image data in which an image generated by conversion of an external signal is accumulated, when the image is input, storing the generated pieces of image data, and generating a final image using at least one of the stored pieces of image data.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments are be described in detail with reference to the accompanying drawings. Expressions such as "at least one of," when preceding a list of elements, modify the entire list of elements and do not modify the individual elements of the list.

Figure 1:
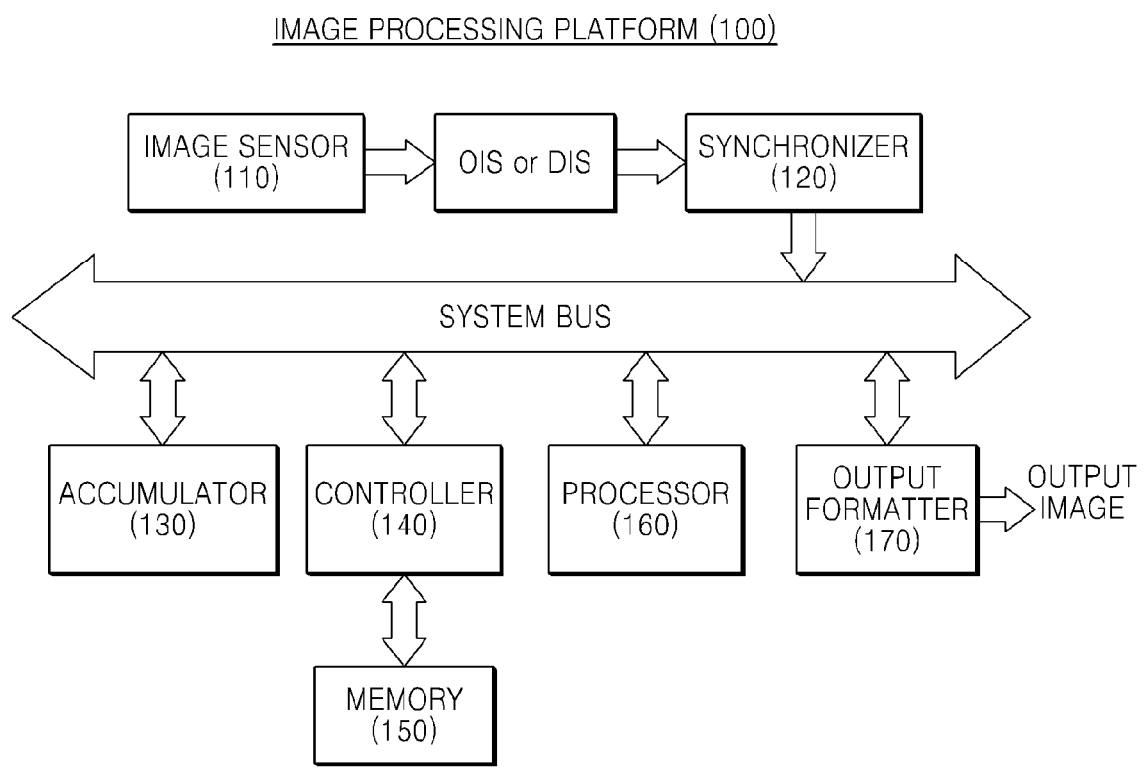
FIG. 1 is a diagram illustrating an exemplary image processing platform.

FIG. 1 is a diagram illustrating an image processing platform 100. As illustrated by FIG. 1, the image processing platform 100 includes an image sensor 110, a synchronizer 120, an accumulator 130, a controller 140, a memory 150, a processor 160, and an output formatter 170.

The image processing platform 100 performs image processing on an input signal that is input to the image sensor 110 so as to generate an output image. For example, the input signal may be light that is incident from the outside of the image sensor 110. The image processing platform 100 determines an image processing method according to conditions of an input image, and processes the input image according to the determined method, thereby generating a high-contrast and high-resolution output image.

The image processing platform 100 analyzes the conditions of the input image so as to perform image processing according to the conditions of the input image. For example, the input image may be a backlight image, a low illumination image, or an image in which a camera shake occurs. The image processing platform 100 analyzes the type of the input image, and determines an image processing method according to the analysis result. Thus, in any state of the input image, the image processing platform 100 may improve the quality of the input image by performing image processing according to the conditions of the input image. The image processing platform 100 may determine any defect in the input image, and may generate a final image from which the defect is removed.

The image sensor 110 converts an external signal into an image. The image sensor 110 converts an input signal into an electrical signal, and generates an image using the electrical signal. For example, the external signal may be light.

A camera-shake correction or the like may be performed on an image that is output from the image sensor 110. An optical image stabilization method and a digital image stabilization method may be used as a camera-shake correction method.

The image sensor 110 may be a charge-coupled device (CCD) or a complementary metal-oxide-semiconductor (CMOS) sensor. In a case of the CMOS sensor, when an image is captured, lines may have different exposure timing, and thus a rolling shutter phenomenon occurs. As a method of lessening the rolling shutter phenomenon, a CMOS having a high-speed frame rate may be used. Thus, an interval of an exposure timing between the lines may be reduced, thereby lessening the rolling shutter phenomenon.

The synchronizer 120 performs synchronization of a frequency. The synchronizer 120 equalizes frequencies during data processing between the image sensor 110 and a system bus.

The accumulator 130 accumulates images. The accumulator 130 accumulates at least one image so as to generate image data. The accumulator 130 combines images so as to generate an accumulated image.

An exemplary function of the accumulator 130 is described with reference to FIGS. 2 to 4.

The controller 140 controls operations of devices included in the image processing platform 100. For example, the controller 140 may control an operation time or the like of the synchronizer 120 or the accumulator 130. The controller 140 may determine a maximum number of images that are accumulated by the accumulator 130 so as to control the accumulator 130 to accumulate images. The controller 140 controls the memory 150.

The memory 150 stores data. For example, the memory 150 may store the images that are accumulated by the accumulator 130. The memory 150 may store the image that is converted by the image sensor 110. The memory 150 is controlled by the controller 140.

The processor 160 performs image processing for image data. The image processing for image data, which is performed by the processor 160 is described below in detail with reference to FIG. 2 and subsequent figures.

The output formatter 170 outputs an image on which image processing is performed to the outside of the image processing platform 100. For example, the output formatter 170 transmits the output image to an external display device (not shown) or another electronic device (not shown).

Figure 2:
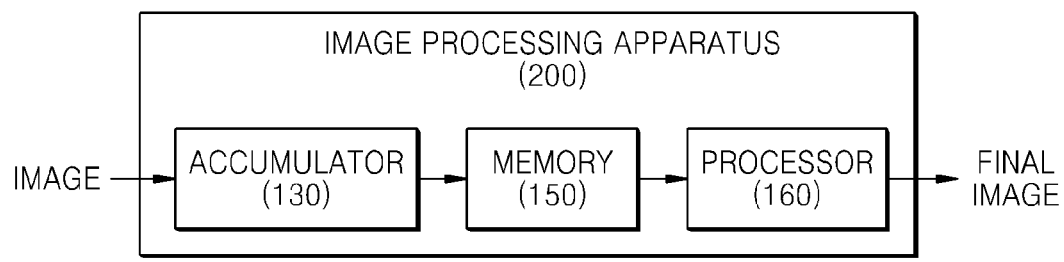
FIG. 2 is a diagram illustrating an image processing apparatus according to an embodiment.

FIG. 2 is a diagram illustrating an image processing apparatus 200 according to an embodiment. The image processing apparatus 200 includes the accumulator 130, the memory 150, and the processor 160.

The image processing apparatus 200 adaptively performs image processing according to conditions of an input image and outputs a final image. The input image may include rolling shutter distortion, low illumination noise, or the like, and the image processing apparatus 200 analyzes conditions of the input image and performs image processing on the basis of the analysis result. The image processing apparatus 200 may generate image data in which at least one image is accumulated, and may perform image processing by using the image data.

The image processing apparatus 200 outputs a final image having a frame rate that is different from a frame rate of the input image. When the frame rate of the input image is higher than the frame rate of the final image that is output by the image processing apparatus 200, the image processing apparatus 200 performs image processing on an image that is input on the basis of the frame rate of the input image and the frame rate of the final image. For example, when the frame rate of the input image is higher than the frame rate of the final image, the image processing apparatus 200 may generate one final image by accumulating a plurality of input images. A number of image images that are accumulated by the image processing apparatus 200 may be a value that is obtained by dividing the frame rate of the input image by the frame rate of the final image. The frame rate refers to the number of images per unit time.

The accumulator 130 accumulates input images. The accumulator 130 outputs image data in which images are accumulated, when an image is input thereto, e.g., whenever an image an image is input thereto. The image data refers to data in which two or more images are accumulated, or one image may be referred to as image data as occasion demands. The accumulator 130 accumulates an image that is currently input when an image is input thereto, e.g., whenever an image is input thereto, in addition to the pieces of image data that have been accumulated thus far.

For example, the accumulator 130 may combine pixel values of corresponding pixels in pixels of images or pieces of image data so as to accumulate the images or the pieces of image data. The images or the pieces of image data may be classified as a plurality of pixels, and each pixel has a pixel value. When the accumulator 130 accumulates two images, the accumulator 130 may combine pixel values of pixels at the same position in pixels of the two images so as to accumulate the two images.

The accumulator 130 outputs the generated image data to the memory 150. The accumulator 130 generates new image data by accumulating two images or an image and image data, and outputs the generated image data to the memory 150. When the next image is input to the accumulator 130, the accumulator 130 may accumulate image data that is most recently stored in the memory 150 and the input image.

The memory 150 stores an image or image data. When an image is initially input to the image processing apparatus 200, the accumulator 130 stores the input image in the memory 150 because the accumulator 130 has no image to accumulate. When two or more images are input to the image processing apparatus 200, the accumulator 130 accumulates a plurality of images so as to generate image data, and the memory 150 stores the generated image data.

The processor 160 generates a final image using the image or image data which is stored in the memory 150. For example, the processor 160 may generate a final image by synthesizing images or image data. When some pixel values of image data have a saturated value, the processor 160 may generate a final image by replacing the saturated pixel value with a pixel value of an image. A process of generating a final image by the processor 160 is described with reference to FIG. 5.

The processor 160 adaptively generates a final image according to image conditions. An image may include defects by various factors. For example, a bright or dark image may be present according to the intensity of external light. When an image is captured using a camera, an image in which an object blurs due to a camera shake may be present. Accordingly, the processor 160 analyzes what type of defects the image includes, and generates a final image from which the defects are removed, on the basis of the analysis result.

The processor 160 may selectively use a plurality of pieces of image data that are stored in the memory 150. For example, when an image is a low illumination image, the processor 160 may generate a final image using image data in which a maximum number of images is accumulated, from among pieces of image data that are stored in the memory 150. When an image includes both a bright region and a dark region, the processor 160 may generate a final image by synthesizing image data in which only one image is accumulated and image data in which a maximum number of images is accumulated, from among the pieces of image data that are stored in the memory 150.

Figure 3:
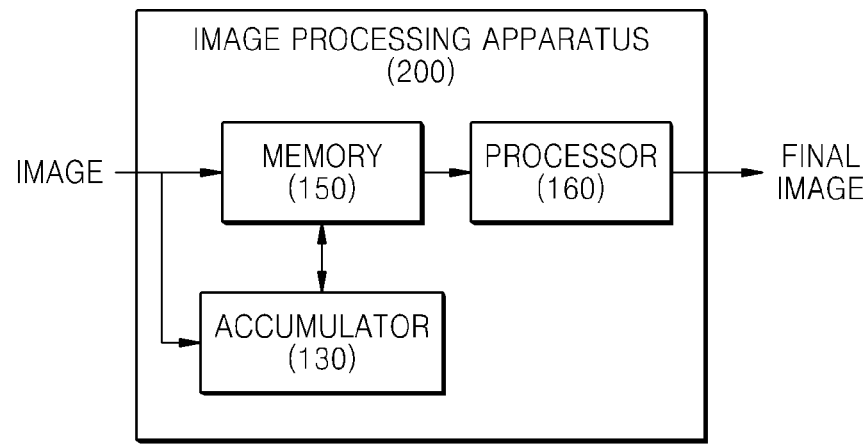
FIG. 3 is a diagram illustrating an image processing apparatus according to an embodiment.

FIG. 3 is a diagram illustrating the image processing apparatus 200 according to an embodiment. As illustrated by FIG. 3, in the image processing apparatus 200, the memory 150 and the accumulator 130 may be connected to each other in parallel. In FIG. 2, the accumulator 130 and the memory 150 are connected to each other in series, and thus an image that is input to the image processing apparatus 200 is input to the accumulator 130. However, in FIG. 3, the accumulator 130 and the memory 150 are connected to each other in parallel, and thus an image that is input to the image processing apparatus 200 may be directly input to the memory 150, or an image that is stored in the memory 150 may be output to the accumulator 130.

When an image is initially input to the image processing apparatus 200, the initially input image is directly stored in the memory 150. When the next image is input to the image processing apparatus 200, the image is input to the accumulator 130, and the accumulator 130 generates image data by synthesizing the image that is initially stored in the memory 150 and an image that is currently input. The accumulator 130 stores the generated image data in the memory 150.

Figure 4:
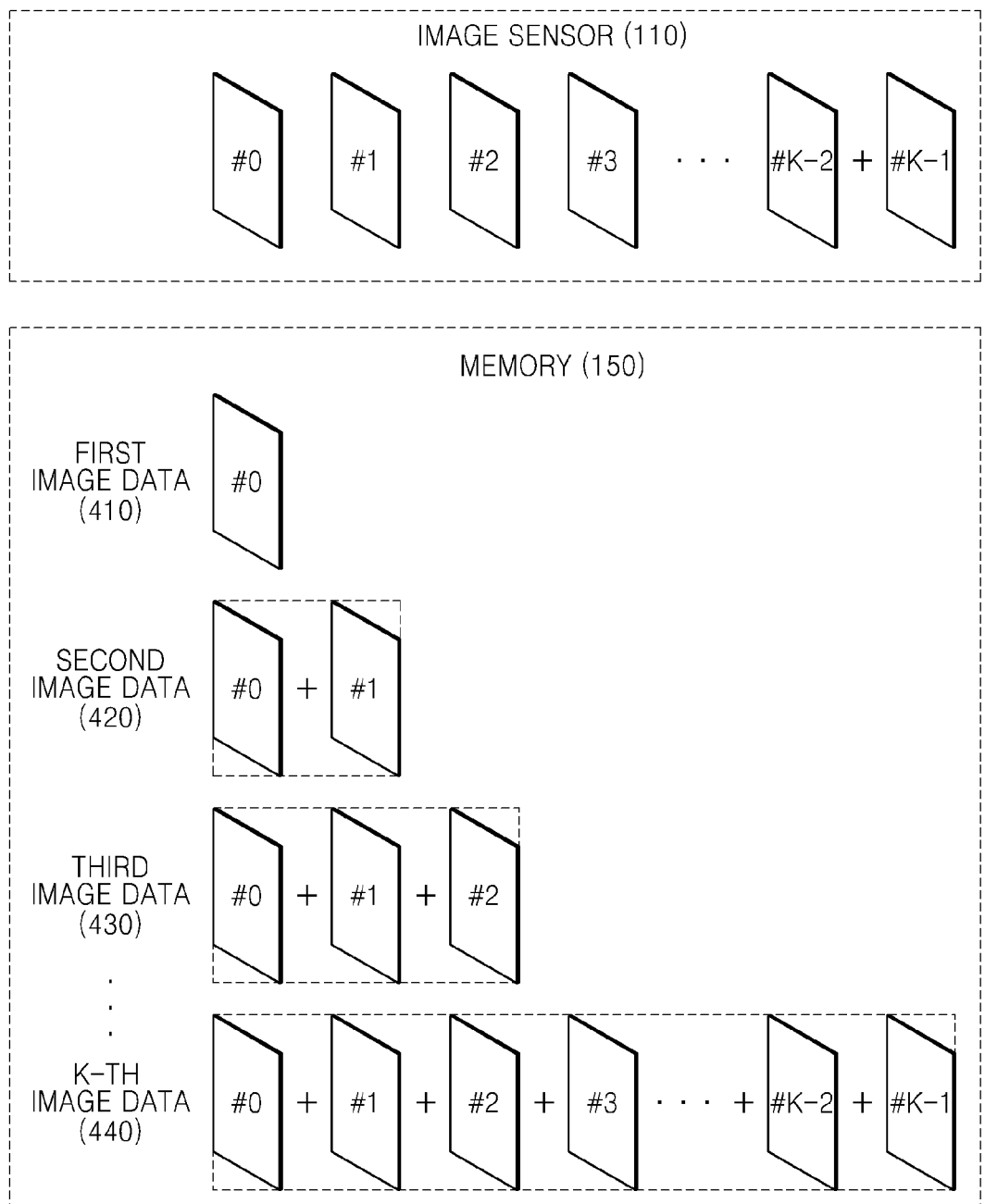
FIG. 4 is a diagram illustrating exemplary image data that is generated by an image processing apparatus.

FIG. 4 is a diagram illustrating exemplary image data that is generated by the image processing apparatus 200. FIG. 4 illustrates a plurality of images that are generated by the image sensor 110 and a plurality of pieces of image data 410 to 440 that are stored in the memory 150. The image sensor 110 generates K images, and the memory 150 stores image data in which the K images are accumulated. The memory 150 stores all first to K-th image data 410 to 440.

The first image data 410 represents an image #0 that is generated by the image sensor 110. The second image data 420 represents image data in which the image #0 and an image #1 are combined. The third image data 430 represents image data in which the image #0 to an image #2 are combined. The K-th image data 440 represents image data in which the image #0 to an image #K−1 are combined.

Figure 5:
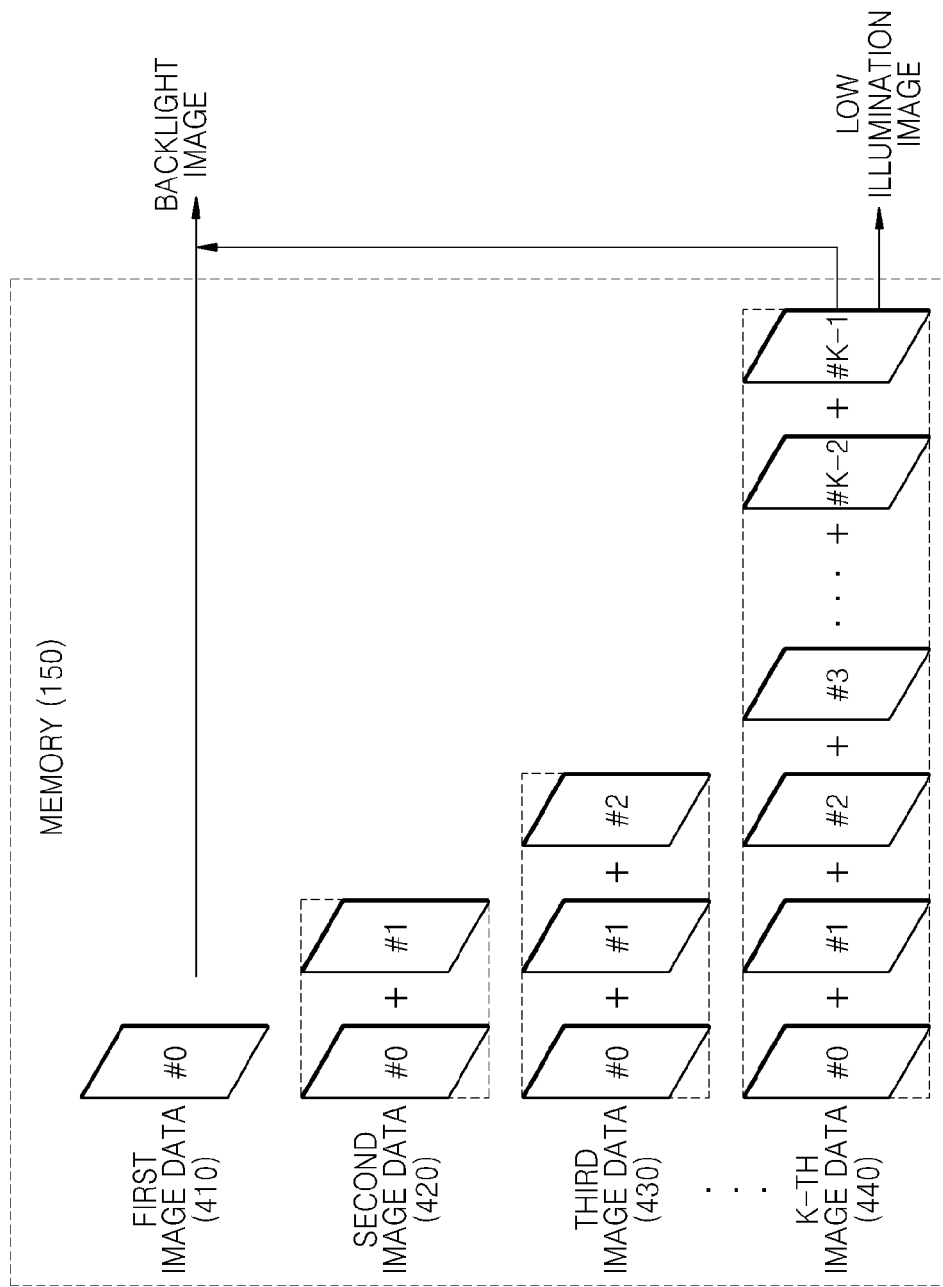
FIG. 5 is a sequence diagram illustrating an exemplary method of adaptively processing images by an image processing apparatus according to image conditions.

FIG. 5 is a diagram illustrating a method of adaptively processing images by an image processing apparatus 200 according to image conditions. As illustrated by FIG. 5, the image processing apparatus 200 analyzes or determines conditions of an image so as to determine image data that is necessary when generating a final image. The processor 160 of the image processing apparatus 200 may perform a process of generating the final image.

The processor 160 analyzes conditions of an image. The processor 160 determines whether the image is a backlight image, a low illumination image, or the like. A case where an image is a backlight image or a low illumination image is illustrated in FIG. 5, but even when the image includes other defects, the image can be classified according to a standard that is set with respect to each defect.

A case of determining whether an image is a backlight image is disclosed. The processor 160 analyzes pixel values of the K-th image data 440 so as to determine that an image is a backlight image. For example, the processor 160 determines whether a pixel having a saturated pixel value is present, from among the pixel values of the K-th image data 440. When the number of pixels having a saturated pixel value is greater than a predetermined threshold value, the processor 160 may determine the image as a backlight image. That is, when pixel values of some regions of the image are saturated due to backlight, the image is determined to be a backlight image. Various methods may be used as a method of determining whether the image is a backlight image, and an exemplary embodiment is not limited to the above-described method. The processor 160 may set a plurality of conditions for determining whether the image is a backlight image. When the image corresponds to any one of the plurality of conditions, the processor 160 may determine that the image is a backlight image.

A case of determining whether an image is a low illumination image is disclosed. The processor 160 determines whether an average pixel value of the first image data 410 is smaller than a predetermined threshold value. When the average pixel value of the first image data 410 is smaller than the predetermined threshold value, the processor 160 may determine the image to be a low illumination image. Various methods may be used as a method of determining whether the image is a low illumination image, and an exemplary embodiment is not limited to the above-described method. The processor 160 may set a plurality of conditions for determining whether the image is a low illumination image. When the image corresponds to any one of the plurality of conditions, the processor 160 may determine that the image is a low illumination image.

The processor 160 determines whether a request for the generation of an HDR or WDR image is present. When the request for the generation of an HDR or WDR image is present, the processor 160 generates the HDR or WDR image according to a predetermined algorithm. For example, when a request for the generation of an HDR image is present, the processor 160 generates the HDR image using all the first to K-th image data 410 to 440 that are stored in the memory 150.

The processor 160 determines image data that is necessary when generating a final image, from among the first to K-th image data 410 to 440. The processor 160 may determine image data that is necessary when generating the final image, according to image conditions. For example, when an image is determined to be a backlight image, the processor 160 selects the first image data 410 and the K-th image data 440. When an image is determined to be a low illumination image, the processor 160 selects the K-th image data 440.

The processor 160 generates a final image by removing defects in the image, using the selected image data. For example, when the image is a low illumination image, the processor 160 may select the K-th image data 440. The K-th image data 440 is image data in which K images are accumulated, and thus the K-th image data 440 has higher illumination than image data in which one image is accumulated. The processor 160 may output a bright image by outputting the K-th image data 440 as a final image. In a low illumination environment, a bright image may be generated by increasing an exposure time of the image sensor 110, but as the exposure time is increased, a possibility of noise occurring due to the movement of an object grows. The K-th image data 440 is data in which images having a short exposure time are accumulated, and thus noise due to the movement of an object may be less than that of an image having a relatively long exposure time. As a result, the processor 160 may output a bright image having less noise due to the movement of an object by outputting the K-th image data 440.

In a case of a backlight image, the processor 160 may select the first and K-th image data. The processor 160 removes defects due to backlight by replacing pixel values of pixels having a saturated pixel value due to backlight in the K-th image data with pixel values of the first image data. The processor 160 replaces the pixel values saturated in the K-th image data with pixel values of pixels at the same position in the first image data. Since the first image data is image data that is generated for a short exposure time, the first image data is less influenced by backlight. Accordingly, the processor 160 may remove the defects of the K-th image data using the pixel values of the first image data.

Figure 6:
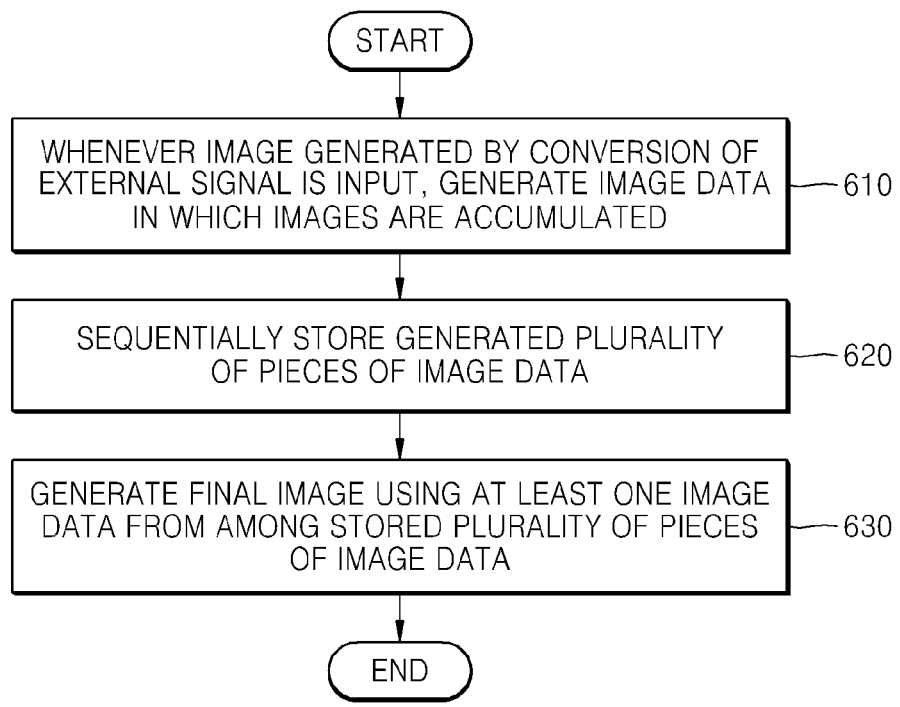
FIG. 6 is a flowchart illustrating an image processing method according to an embodiment.

FIG. 6 is a flowchart illustrating an image processing method according to an embodiment. As illustrated by FIG. 6, the image processing method includes operations that may be sequentially processed, for example, in the image processing apparatus 200 illustrated in FIG. 2 or FIG. 3. The image processing apparatus 200 may be applied to the image processing method of FIG. 6. An exemplary method of processing an input image by an image processing apparatus 200 is disclosed.

In operation 610, when an image generated by the conversion of an external signal is input to the image processing apparatus 200, the image processing apparatus 200 generates image data in which images are accumulated. When a first image is input to the image processing apparatus 200, the image processing apparatus 200 stores the input image in the memory 150 because the image processing apparatus 200 has no image to accumulate. When a second image is input to the image processing apparatus 200, the image processing apparatus 200 synthesizes the first image and the second image so as to generate image data. When an image is input to the image processing apparatus 200, the image processing apparatus 200 generates image data by accumulating the images until a K-th image is input to the image processing apparatus 200.

In operation 620, the image processing apparatus 200 stores, e.g., sequentially stores the generated plurality of pieces of image data. The image processing apparatus 200 stores pieces of image data that are generated when an image is input thereto. The pieces of image data that are sequentially stored are pieces of image data in which different numbers of images are accumulated. However, it is understood that according to an exemplary embodiment, the storing may be parallel or random.

In operation 630, the image processing apparatus 200 generates a final image using at least one image data from among the stored plurality of pieces of image data.

Figure 7:
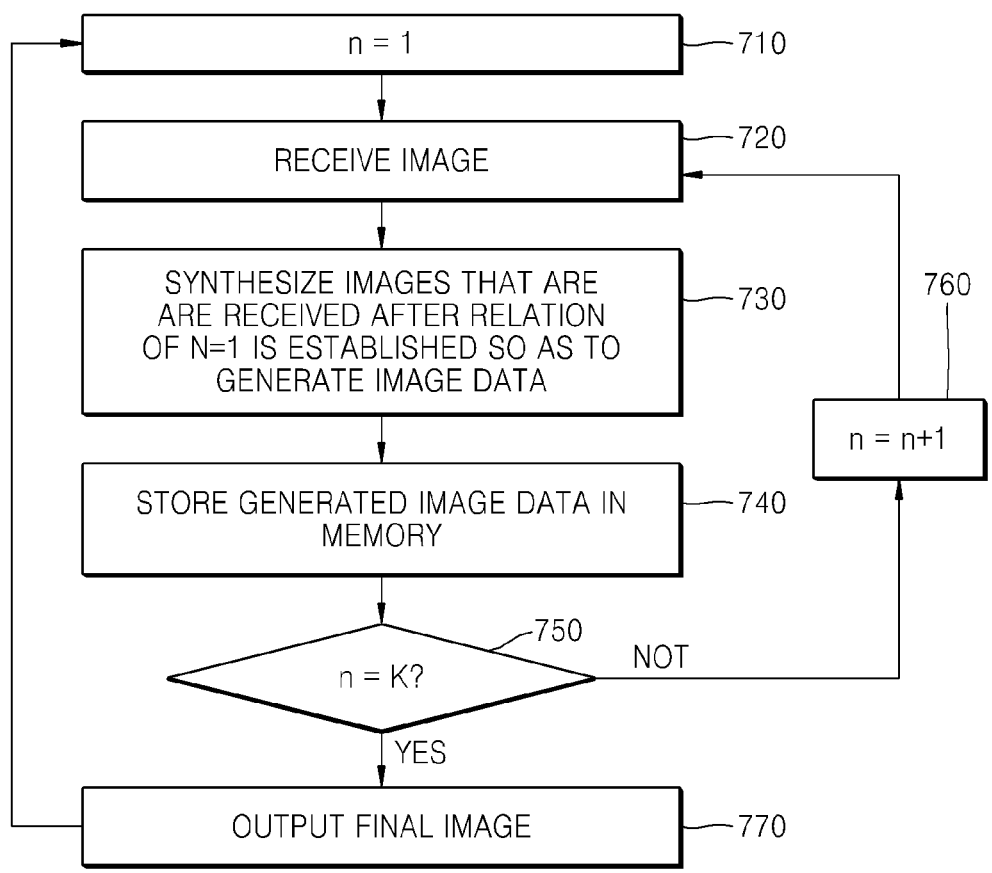
FIG. 7 is a flowchart illustrating an image processing method according to an embodiment.

FIG. 7 is a flowchart illustrating an image processing method according to an embodiment. As illustrated by FIG. 7, the image processing method includes operations that may be sequentially processed in an image processing apparatus 200 illustrated in FIG. 2 or FIG. 3. An image processing apparatus 200 may be applied to the image processing method of FIG. 7. An exemplary method of processing an input image by the image processing apparatus 200 is disclosed.

In operation 710, the image processing apparatus 200 sets n to 1, where n may be defined as a variable for counting accumulated images.

In operation 720, the image processing apparatus 200 receives an image. The image may be received from the image sensor 110.

In operation 730, the image processing apparatus 200 synthesizes images that are received after the relation of n=1 is established so as to generate image data. For example, when three images are received after the relation of n=1 is established, the image processing apparatus 200 generates image data in which three images are accumulated. When the relation of n=K is established and the relation of n=1 is established, e.g., reestablished, the image processing apparatus 200 generates image data by accumulating images that are input after the relation of n=1 is established, e.g., reestablished.

In operation 740, the image processing apparatus 200 stores the generated image data in the memory 150. The memory 150 stores image data when the image data is generated, e.g., whenever the image data is generated.

In operation 750, the image processing apparatus 200 determines whether n is equal to K. When n is equal to K, the method proceeds to operation 770, and thus the image processing apparatus 200 generates a final image. When n is not equal to K, the method proceeds to operation 760, and thus n is increased by one, and then the method proceeds to operation 720. Accordingly, n is increased by one until the relation of n=K is established.

In operation 770, the image processing apparatus 200 may generate a final image by multiplying the image data in which K images are accumulated, 1/K times. The image processing apparatus 200 may generate the final image by synthesizing image data in which one image is accumulated and the image data in which K images are accumulated. When operation 770 ends, the method proceeds to operation 710, and thus n is set to 1 again. The image processing apparatus 200 may repeatedly perform the above-described process on images that are received by repeatedly performing operations 720 to 770.

A value of K that is set in FIG. 7 may be determined, for example, according to a frame rate of the image sensor 110 and a frame rate of the image processing apparatus 200. The image sensor 110 having a high-speed frame rate has a greater number of images that are generated per unit time than images that are output per unit time in the image processing apparatus 200. Accordingly, the image processing apparatus 200 accumulates and outputs images that are input at a high frame rate, thereby allowing rates of an input image and an output image to be adjusted.

According to an embodiment, it is possible to perform adaptive image processing according to image conditions, using pieces of image data in which images that are input from an image sensor are sequentially accumulated.

According to an embodiment, it is possible to remove defects in an image by analyzing the defects in the image and using a plurality of pieces of image data according to the analysis result.

An exemplary embodiment of the present invention can be written as a non-transitory computer program and can be implemented in general-use digital computers that execute the programs using a computer-readable recording medium. Examples of the computer-readable recording medium include magnetic storage media (e.g., ROM, floppy disks, hard disks, etc.), optical recording media (e.g., CD-ROMs or DVDs), and storage media.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing apparatus comprising:
an accumulator configured to generate one or more image sets by accumulating different number of images to each set,
wherein the images are captured at a same exposure time by an image sensor;
a memory configured to store the image sets; and
a processor configured to analyze conditions of the images and generate a final image using the image sets on a basis of the analysis result,
wherein the processor determines whether the image that is input from the image sensor is a backlight image, and when the image is a backlight image, the final image is generated using an image set in which one image is accumulated and an image set in which all of images are accumulated, from among the image sets.

2. The image processing apparatus of claim 1, wherein a maximum number of images that are accumulated by the accumulator is determined on a basis of a frame rate of the image sensor and a frame rate of the final image that is output from the image processing apparatus.

3. The image processing apparatus of claim 2, wherein the maximum number of images has a value that is obtained by dividing the frame rate of the image sensor by the frame rate of the image that is output from the image processing apparatus.

4. The image processing apparatus of claim 1, wherein the processor determines whether the image that is input from the image sensor is a low illumination image, and when the image is a low illumination image, the final image is generated using an image set in which a maximum number of images is accumulated, from among the image sets.

5. The image processing apparatus of claim 1, wherein the processor generates a high dynamic range image by synthesizing image sets in which one image is accumulated and an image set in which a maximum number of images is accumulated, from among the image sets that are stored in the memory.

6. The image processing apparatus of claim 1, wherein the processor performs a camera-shake correction on the image that is output from the image sensor and outputs the corrected image to the accumulator.

7. The image processing apparatus of claim 1, wherein the memory sequentially stores the image sets.

8. An image processing method comprising:
generating one or more image sets by accumulating different number of images to each set,
wherein the images are captured at a same exposure time;
storing the image sets; and
analyzing conditions of the images and generating a final image using the image sets on a basis of the analysis result,
wherein the generating the final image comprises determining whether the image is a backlight image, and generating the final image using an image set in which one image is accumulated and an image set in which all of images are accumulated from among the image sets, when the image is a backlight image.

9. The image processing method of claim 8, wherein in the generating one or more image sets, a maximum number of images accumulated is determined on a basis of a frame rate of an input image and a frame rate of the final image.

10. The image processing method of claim 9, wherein the maximum number of images has a value obtained by dividing the frame rate of the input image by the frame rate of the final image.

11. The image processing method of claim 8, wherein the generating of the final image comprises determining whether the image is a low illumination image, and generating the final image using an image set in which a maximum number of images is accumulated from among the image sets, when the image is a low illumination image.

12. The image processing method of claim 8, wherein the generating of the final image comprises generating a high dynamic range image by synthesizing image sets in which one image is accumulated and an image set in which a maximum number of images is accumulated from among the image sets.

13. The image processing method of claim 8, wherein the storing the accumulated image sets is a sequential storing.

* * * * *